(12) United States Patent  
Kadonaga et al.

(10) Patent No.: US 7,118,421 B2  
(45) Date of Patent: Oct. 10, 2006

(54) ADAPTER DEVICE FOR ELECTRONIC EQUIPMENT

(75) Inventors: Akira Kadonaga, Kanagawa (JP); Kouji Hamada, Aichi (JP); Masashi Watanabe, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/510,724

(22) PCT Filed: Jan. 7, 2004

(86) PCT No.: PCT/JP2004/000036

§ 371 (c)(1),
(2), (4) Date: Oct. 8, 2004

(87) PCT Pub. No.: WO2004/070889

PCT Pub. Date: Aug. 19, 2004

(65) Prior Publication Data

US 2005/0239335 A1    Oct. 27, 2005

(30) Foreign Application Priority Data

Feb. 10, 2003   (JP)   ............ P2003-032829

(51) Int. Cl.
*H01R 25/00* (2006.01)
(52) U.S. Cl. .................................. 439/638
(58) Field of Classification Search ............ 439/638
See application file for complete search history.

(56) References Cited

U.S. PATENT DOCUMENTS

| | | | | |
|---|---|---|---|---|
| 4,908,817 | A | * | 3/1990 | Sandell et al. ............ 720/743 |
| 5,184,282 | A | * | 2/1993 | Kaneda et al. ............ 361/737 |
| 5,785,541 | A | * | 7/1998 | Best et al. ............... 439/164 |
| 5,877,488 | A | * | 3/1999 | Klatt et al. .............. 235/486 |
| 5,955,722 | A | * | 9/1999 | Kurz et al. .............. 235/479 |
| 5,993,261 | A |   | 11/1999 | Klatt et al. |
| 6,164,989 | A | * | 12/2000 | Glad et al. .............. 439/131 |
| 6,173,405 | B1 | * | 1/2001 | Nagel .................... 726/21 |
| 6,189,786 | B1 | * | 2/2001 | Itou et al. .............. 235/379 |
| 6,213,403 | B1 | * | 4/2001 | Bates, III .............. 235/492 |
| 6,219,256 | B1 | * | 4/2001 | Wu ..................... 361/801 |
| 6,224,391 | B1 | * | 5/2001 | Horie et al. ............ 439/64 |

(Continued)

FOREIGN PATENT DOCUMENTS

EP    0 858 046    8/1998

(Continued)

*Primary Examiner*—Ross Gushi
(74) *Attorney, Agent, or Firm*—Frommer Lawrence & Haug LLP; William S. Frommer; Thomas F. Presson

(57) ABSTRACT

The present invention is directed to an adapter device for electronic equipment, which is adapted to have ability to load another electronic equipment at a loading unit of the existing IC card, and comprises a casing (31) loaded at a host equipment (1), a loading portion (35) in which the IC card (10) is loaded, a terminal portion (53) for performing transmission/reception of data to and from the host equipment provided at front surface (31a) side serving as insertion side into the host equipment, an insertion/withdrawal opening (52) for IC card provided in a manner continuous to the loading portion, a connecting terminal (44) electrically connected to a terminal portion and connected to a terminal portion (12) of the IC card, and cut portions (67), (68) having dimensions different from each other, which allow the rear surface side of the IC card formed at surfaces opposite to each other of the rear surface side of the casing to be exposed.

6 Claims, 6 Drawing Sheets

U.S. PATENT DOCUMENTS

| | | | |
|---|---|---|---|
| 6,234,845 B1 * | 5/2001 | Hakozaki | 439/633 |
| 6,250,965 B1 * | 6/2001 | Neifer | 439/630 |
| 6,257,902 B1 * | 7/2001 | Shieh | 439/76.1 |
| 6,264,506 B1 * | 7/2001 | Yasufuku et al. | 439/638 |
| 6,266,724 B1 * | 7/2001 | Harari et al. | 710/301 |
| 6,272,017 B1 * | 8/2001 | Klatt et al. | 361/737 |
| 6,276,944 B1 * | 8/2001 | Klatt | 439/76.1 |
| 6,315,205 B1 * | 11/2001 | Bates, III | 235/479 |
| 6,324,064 B1 * | 11/2001 | Schneider | 361/737 |
| 6,333,854 B1 * | 12/2001 | Sasaoka et al. | 361/737 |
| 6,381,622 B1 * | 4/2002 | Harari et al. | 710/301 |
| 6,390,855 B1 * | 5/2002 | Chang | 439/638 |
| 6,402,558 B1 * | 6/2002 | Hung-Ju et al. | 439/638 |
| 6,413,108 B1 * | 7/2002 | Centofante | 439/267 |
| 6,443,361 B1 * | 9/2002 | Klatt et al. | 235/486 |
| 6,457,647 B1 * | 10/2002 | Kurihashi et al. | 235/486 |
| 6,460,772 B1 * | 10/2002 | Stahl | 235/486 |
| 6,518,927 B1 * | 2/2003 | Schremmer et al. | 343/702 |
| 6,524,137 B1 * | 2/2003 | Liu et al. | 439/638 |
| 6,550,684 B1 * | 4/2003 | Zuin et al. | 235/486 |
| 6,561,851 B1 * | 5/2003 | Florescu | 439/630 |
| 6,570,767 B1 * | 5/2003 | Vapaakoski et al. | 361/737 |
| 6,574,112 B1 * | 6/2003 | Washino et al. | 361/752 |
| 6,592,031 B1 * | 7/2003 | Klatt | 235/382 |
| 6,658,516 B1 * | 12/2003 | Yao | 710/301 |
| 6,665,190 B1 * | 12/2003 | Clayton et al. | 361/736 |
| 6,666,382 B1 * | 12/2003 | Lisimaque et al. | 235/492 |
| 6,736,678 B1 * | 5/2004 | Yao | 439/638 |
| 6,751,694 B1 * | 6/2004 | Liu et al. | 710/301 |
| 6,761,313 B1 * | 7/2004 | Hsieh et al. | 235/451 |
| 6,764,346 B1 * | 7/2004 | Fujita et al. | 439/638 |
| 6,768,644 B1 * | 7/2004 | Kakinoki et al. | 361/737 |
| 6,768,645 B1 * | 7/2004 | Kadonaga | 361/737 |
| 6,776,348 B1 * | 8/2004 | Liu et al. | 235/492 |
| 6,783,076 B1 * | 8/2004 | Kondo et al. | 235/492 |
| 6,817,523 B1 * | 11/2004 | Chen et al. | 235/441 |
| 6,821,155 B1 * | 11/2004 | Hsieh | 439/630 |
| 6,824,431 B1 * | 11/2004 | Shimada et al. | 439/630 |
| 6,832,920 B1 * | 12/2004 | Glad et al. | 439/131 |
| 6,859,369 B1 * | 2/2005 | Mambakkam et al. | 361/737 |
| 6,888,724 B1 * | 5/2005 | Shaie | 361/719 |
| 6,890,188 B1 * | 5/2005 | Le | 439/76.1 |
| 6,893,268 B1 * | 5/2005 | Harari et al. | 439/43 |
| 6,915,956 B1 * | 7/2005 | Liu et al. | 235/492 |
| 6,920,517 B1 * | 7/2005 | Mills et al. | 710/301 |
| 6,923,379 B1 * | 8/2005 | Washino et al. | 235/492 |
| 6,932,623 B1 * | 8/2005 | Lai | 439/76.1 |
| 2003/0111541 A1 * | 6/2003 | Washino et al. | 235/492 |
| 2003/0161115 A1 * | 8/2003 | Kadonaga | 361/737 |
| 2003/0181074 A1 * | 9/2003 | Liu | 439/67 |
| 2003/0201322 A1 * | 10/2003 | Wu | 235/441 |
| 2003/0235040 A1 * | 12/2003 | Liu et al. | 361/737 |
| 2004/0002264 A1 * | 1/2004 | Yao | 439/638 |
| 2004/0041024 A1 * | 3/2004 | Liu et al. | 235/441 |
| 2004/0050934 A1 * | 3/2004 | Chen et al. | 235/441 |
| 2004/0161978 A1 * | 8/2004 | Nakamura | 439/638 |
| 2005/0037671 A1 * | 2/2005 | Yamada et al. | 439/677 |
| 2005/0070165 A1 * | 3/2005 | Ikeda | 439/630 |
| 2005/0085130 A1 * | 4/2005 | Lai | 439/638 |
| 2005/0088829 A1 * | 4/2005 | Igarashi | 361/737 |
| 2005/0185371 A1 * | 8/2005 | Kuroda et al. | 361/684 |
| 2005/0225950 A1 * | 10/2005 | Matsuda et al. | 361/737 |

FOREIGN PATENT DOCUMENTS

| | | |
|---|---|---|
| EP | 0 883 084 | 12/1998 |
| WO | WO 02/059831 | 8/2002 |

* cited by examiner

ADAPTER DEVICE FOR ELECTRONIC EQUIPMENT

TECHNICAL FIELD

The present invention relates to an adapter device for electronic equipment which can load another electronic equipment with respect to a loading unit of an electronic equipment such as existing IC card, etc.

This Application claims priority of Japanese Patent Application No. 2003-032829, field on Feb. 10, 2003, the entirety of which is incorporated by reference herein.

BACKGROUND ART

Hitherto, as an electronic equipment loaded at host equipment such as personal computer and/or digital still camera, etc., there are used substantially plate-shaped IC cards within which semiconductor integrated circuit elements are included. The IC card includes a substantially rectangular card body within which, e.g., flash memory is included, wherein terminal portions for electrically connecting to host equipment are provided at one short side of the card body.

There are, e.g., small-sized IC cards which are common to such existing IC cards in the electric specification and are different from the latter in outer appearance. Since such small-sized IC cards are different from the existing IC cards in the physical specification, it is impossible to load such small-sized IC card with respect to loading unit of the existing IC card. In view of the above, there are adapter devices which can load small-sized IC card with respect to the loading unit of the existing IC card. As such adapter device, there is an adapter device described in the International Laid Open pamphlet No. WO 02/059831.

At the adapter device described in this pamphlet, a loading portion adapted so that small-sized IC card is loaded therewithin is provided, an insertion/withdrawal opening for the small-sized IC card is provided at the rear surface side in a manner continuous to the loading portion, and terminal portions for performing electrical connection to the host equipment are provided at the front surface side. At the adapter device, cut portions are provided at both corner portions of the rear surface side where insertion/withdrawal portion is provided. The cut portions provided at both corner portions of the rear surface side where the insertion/withdrawal portion is provided allow both corner portions of the rear surface side of the IC card to be faced to the external when the small-sized IC card is loaded with respect to the loading portion to permit user to grasp the portion faced to the external portion from the cut portions of the IC card, e.g., both side surfaces of the rear surface side to take out the IC card loaded at the loading portion from the loading portion.

At the adapter device described in the pamphlet, since both corner portions of the rear surface side of the small-sized IC card loaded at the loading portion are only faced to the external portion from the cut portions at the time of loading of the small-sized IC card, the area that user can grasp the small-sized IC card is small. When user takes out the small-sized IC card from the loading portion, he draws out the IC card loaded at the loading portion in such a manner to grasp side surfaces opposite to each other of the rear surface side of the IC card faced to the external from the cut portions. Since the area that user grasps the IC card is narrow, it becomes difficult to draw or pull out the IC card.

Moreover, portions of the top face and/or the lower face of the IC card are used as memorandum area for memorizing the content, etc. of data that user preserves onto the IC card. The memorandum area is used as area where memorandum is described directly by using pen on the casing by user, and/or is used as an area where label for describing as memorandum is stuck. Namely, label that user has described as memorandum or user intends to describe as memorandum is stuck. However, at the adapter device described in the pamphlet, when the small-sized IC card is loaded with respect to the loading portion, the entirety of the small-sized IC card is covered by the casing except for both corner portions of the rear surface side where cut portions are provided. Accordingly, when the small-sized IC card is loaded at the loading portion of the adapter device, user cannot visually recognize memorandum areas provided at the top face and/or lower face of the IC card. Accordingly, in order to confirm the memorandum area of the small-sized IC card loaded at the adapter device, it is necessary for user to take out the small-sized IC card from the loading portion. It is impossible to easily perform confirmation thereof.

Further, the top face of the adapter device is the portion noticed for user to the greatest degree, and is extremely important area in design. Accordingly, it is desirable that the configurations indispensable in view of function of the adapter device are provided at the lower face side if possible, and the top face can be freely designed if possible.

DISCLOSURE OF THE INVENTION

An object of the present invention is to provide a novel adapter device for electronic equipment which can solve problems that prior arts as described above have.

Another object of the present invention is to provide an adapter device for electronic equipment which makes it possible to easily perform take-out operation of electronic equipment to realize improvement in operability.

A further object of the present invention is to provide an adapter device for electronic equipment which can visually recognize memorandum area provided at an electronic equipment even at the time of loading to thereby realize improvement in operability.

A still further object of the present invention is to provide an adapter device for electronic equipment in which design of outer appearance is caused to become satisfactory.

The adapter device for electronic equipment according to the present invention comprises: a device body loaded with respect to a unit in which the adapter device is loaded; a loading portion provided at the device body and adapted so that there is loaded an electronic equipment in which at least semiconductor integrated circuit elements are included, the electronic equipment being provided at one end thereof with a first terminal portion; a second terminal portion provided at one side surface side serving as insertion side into the unit of the device body and adapted for performing transmission/reception of data to and from the unit; an insertion/withdrawal portion provided, in a manner continuous to the loading portion, at the other surface side opposite to one side surface of the device body; a connecting portion provided at the loading portion, and electrically connected to the second terminal portion and connected to the first terminal portion of the electronic equipment; and cut portions respectively provided at surfaces opposite to each other of the other side surface side of the device body, and serving to face, toward the external, a portion of the other end side of the electronic equipment loaded at the loading portion. The cut portions provided at surfaces opposite to each other are formed so that they are opposite to each other and their dimensions are different from each other.

Still more further objects of the present invention and practical merits obtained by the present invention will become more apparent from the description of the embodiments which will be given below with reference to the attached drawings.

BEST MODE FOR CARRYING OUT THE INVENTION

An adapter device for IC card according to the present invention will be explained with reference to the attached drawings.

Figure 1:
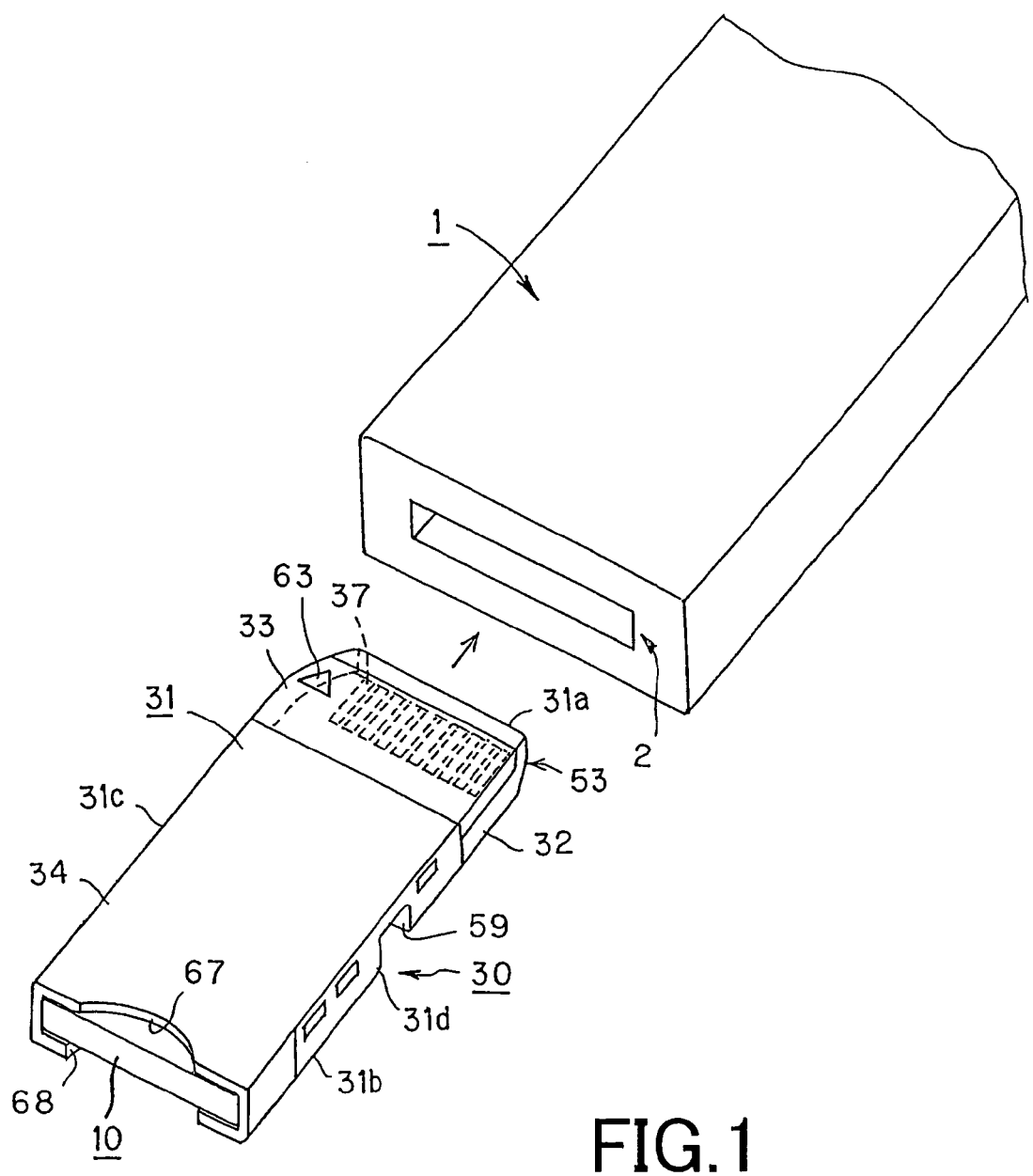
FIG. 1 is a perspective view showing the state where adapter device according to the present invention is inserted into host equipment.
Figure 2:
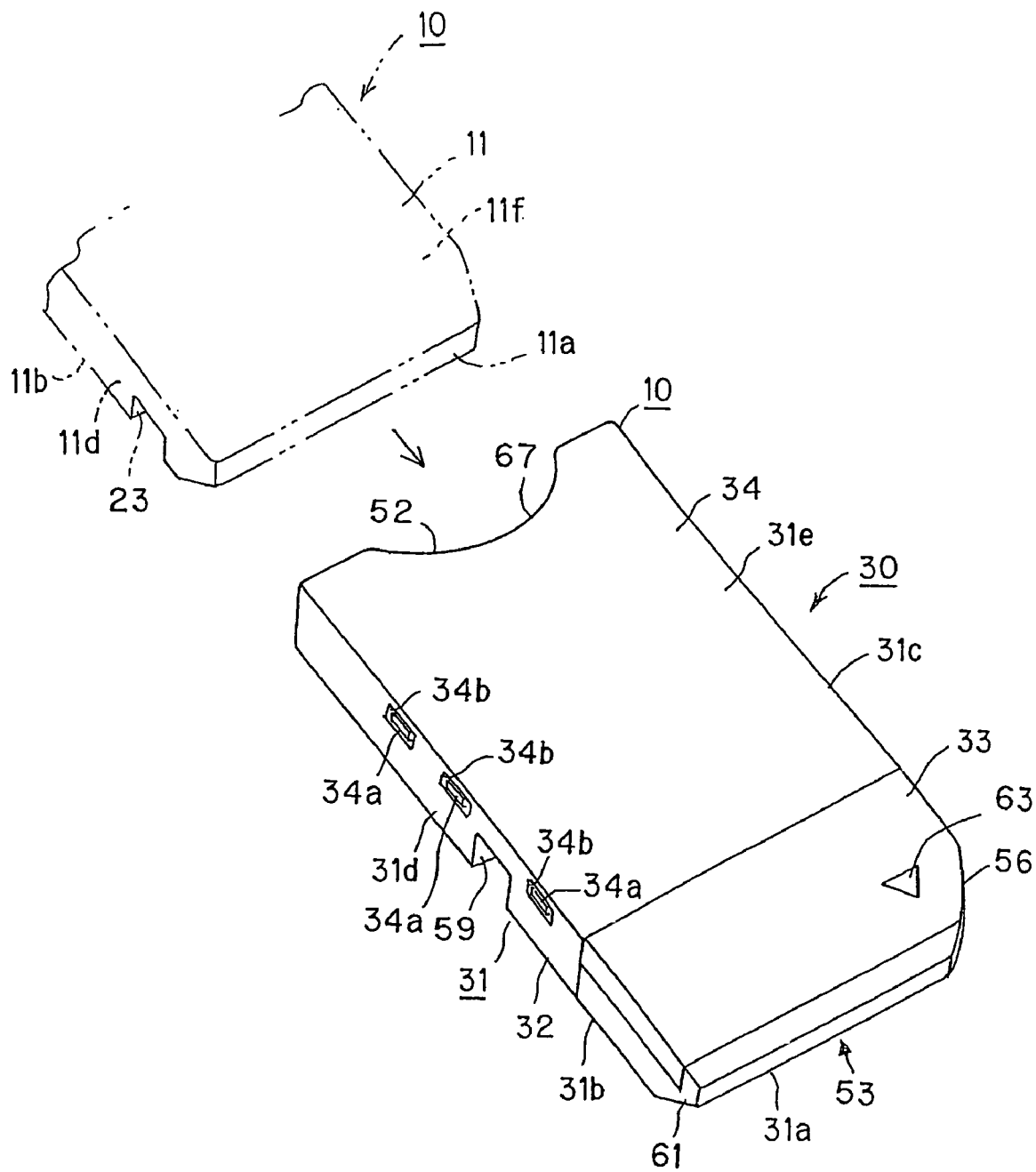
FIG. 2 is a perspective view showing, from the upper side, adapter device in which IC card is loaded.
Figure 3:
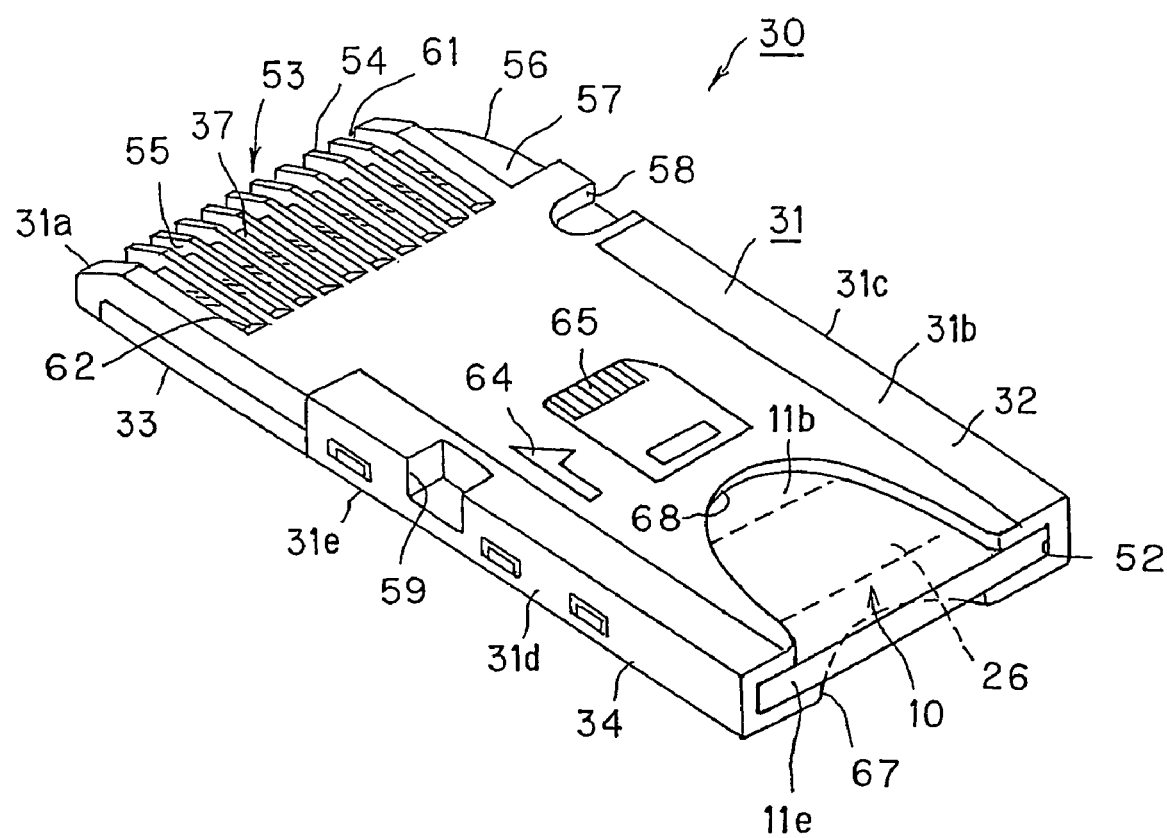
FIG. 3 is a perspective view showing, from the lower side, adapter device in which IC card is loaded.

As shown in FIG. 1, the adapter device 30 according to the present invention is loaded at a loading portion within a host equipment 1 through an insertion opening 2 provided at the host equipment 1 in the state where there is loaded an IC card 10 in which there is included semiconductor memory used as external memory unit for host equipment 1 such as recording and/or reproducing apparatus for audio data, personal computer, digital still camera and/or digital video camera, etc. The adapter device 30 is formed so as to have substantially the same size as the existing IC card, and is adapted for permitting IC card 10 smaller than IC card conventionally used to be loaded at host equipment 1 having loading portion corresponding to IC card conventionally used. As shown in FIGS. 2 and 3, the adapter device 30 includes a casing 31 constituting the device body, wherein the IC card 10 is loaded into the casing 31.

Here, the IC card 10 to be loaded into the casing 31 will be explained. This IC card 10 is common to the existing IC card in the electric specification, and is different from the latter in the physical specification. In concrete terms, the IC card 10 is miniaturized so that its long side is caused to be shorter than long side of the existing IC card.

Figure 4:
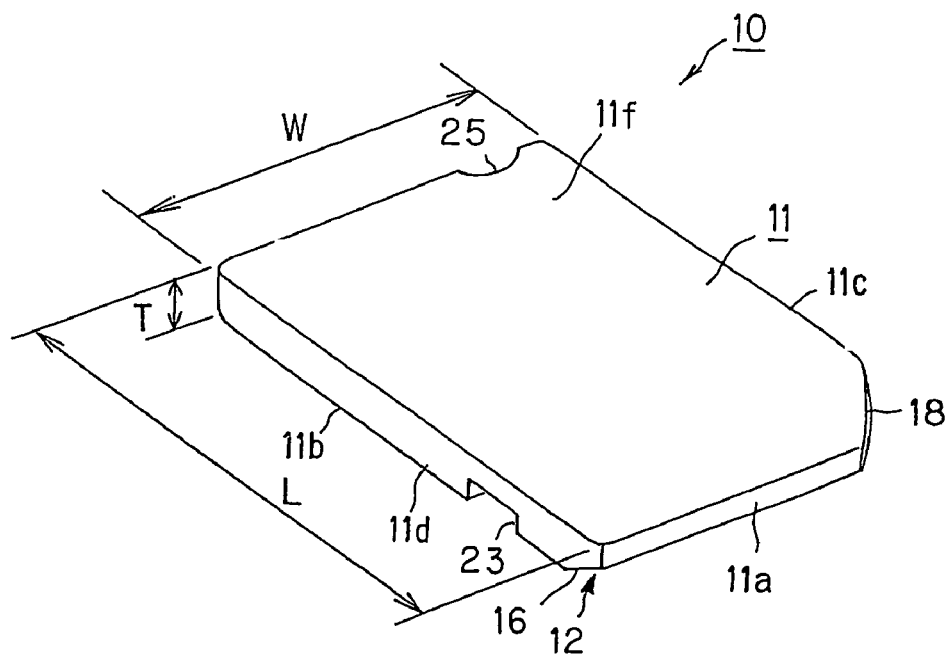
FIG. 4 is a perspective view showing, from the upper side, small-sized IC card loaded into the adapter device.
Figure 5:
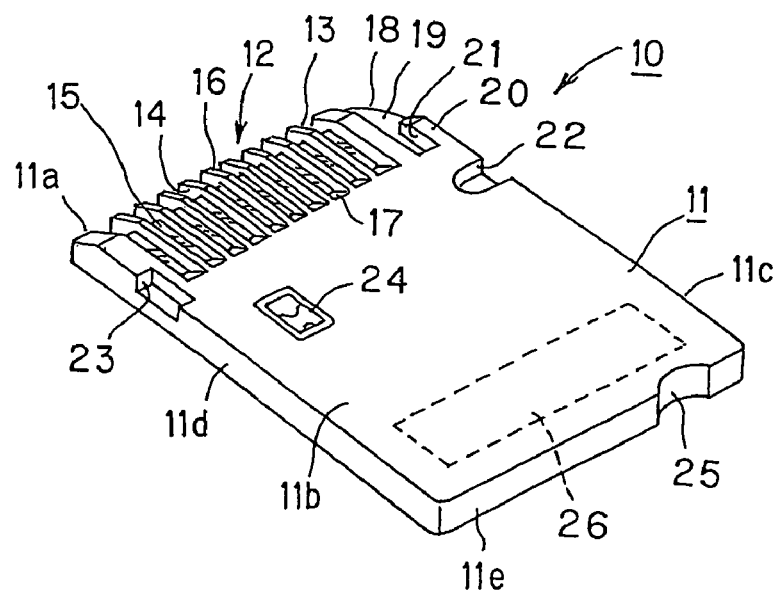
FIG. 5 is a perspective view showing, from the lower side, small-sized IC card loaded into the adapter device.

The IC card 10 comprises, as shown in FIGS. 4 and 5, a substantially rectangular plate-shaped card body 11 obtained by molding synthetic resin material. As shown in FIGS. 4 and 5, within the card body 11, there are included semiconductor memory elements such as flash memory, etc. having large memory capacity of 4 MB (mega bytes) or more, e.g., 4 MB, 16 MB, 32 MB, 64 MB, 128 MB, 256 MB or 1 GB, control circuit elements in which control circuit portions for controlling write operation of data such as audio data, etc. with respect to the semiconductor memory elements, or read-out operation of data such as audio data, etc. stored in the semiconductor memory elements, and plural semiconductor integrated circuit elements such as copyright protection circuit elements, etc. in the state where they are mounted on a printed wiring board.

The card body 11 in which plural semiconductor elements are included as stated above and the printed wiring board on which these semiconductor elements are mounted is included is formed so as to have mechanical strength to such a degree that it is not bent by ordinary external force applied at the time of use, etc. thus to realize protection of included semiconductor elements such as semiconductor memory elements, etc. and the printed wiring board on which these semiconductor elements are mounted. In concrete terms, the card body 11 is formed by molded body of synthetic resin.

The IC card 10 is common to the IC card of the standard use already used in the electrical specification, but is different from the latter in the physical specification. In concrete terms, the IC card 10 is adapted so that the outside configuration is miniaturized to more degree as compared to the standard IC card. Namely, as shown in FIG. 4, the card body 11 is formed as rectangular shape in which length W of the short side is caused to be substantially 20 mm, length L of the long side is caused to be substantially 31 mm, and the thickness T is caused to be substantially 1.6 mm.

It is to be noted that the IC card of the standard size is similar to the above-described IC card 10 in the fundamental specification, but is different from the latter only in the size thereof. The IC card of the standard size is formed as rectangular shape in which length W of the short side is caused to be substantially 21.45 mm, length L of the long side is caused to be substantially 50 mm, and thickness T is caused to be substantially 2.8 mm.

At the side of one short side of the card body 11, as shown in FIG. 5, there is formed a terminal portion 12 in a manner extending from front surface 11a serving as insertion end into the host equipment toward bottom surface 11b. At the terminal portion 12, there are provided plural engagement recessed portions 14 partitioned by partition walls 13 in correspondence with the number of electrodes 15. The respective engagement recessed portions 14 are opened in a manner extending from the front surface 11a of the card body 11 toward the bottom surface 11b thereof so that a group of terminals provided at the loading portion side of the host equipment can be engaged thereinto. The plural electrodes 15 are provided in the state where they are respectively positioned at the bottom surfaces of the respective engagement recessed portions 14, and are separated from each other by the partition walls 13. Since plural respective electrodes 15 are respectively provided at the bottom surfaces of the engagement recessed portions 14 partitioned so that they are smaller than size of finger of the human being by partition walls 13, finger and/or large foreign material are prevented from directly being coming into contact with the IC card 10 at the time of handling thereof. Thus, the IC card 10 is securely protected from stain and/or damage, etc.

At the IC card 10, there are provided ten electrodes 15 constituting the terminal portion 12. Transmission/reception of data between the IC card 10 and the host equipment to which the IC card 10 is loaded is performed by serial interface through the electrodes 15 provided at the terminal portion 12. In concrete terms, at least electrodes 15 are used as at least input termonal for serial protocol bus state signal BS, input terminal for serial protocol data signal SDIO, input terminal for serial clock SCLK, and power supply voltage VCC terminal. It is a matter of course that transmission/reception of data to and from the host equipment may be performed by parallel interface.

At the front surface 11a of the card body 11 and the opening end of the partition walls 13, there are formed, as shown in FIG. 5, inclination surface portions 16 in a manner extending from the middle portion in the thickness direction of the front surface 11a of the card body 11 toward the bottom surface 11b thereof. The inclination surface portion 16 functions as an insertion guide portion when the IC card 10 is inserted into the insertion/withdrawal portion 2 of the host equipment. Moreover, at the card body 11, there are provided inclination surface portions 17 in a manner extending from the bottom surfaces of respective engagement recessed portions 14 toward the bottom surface 11b of the card body 11. When the IC card 10 is loaded at the loading portion of the host equipment, the inclination surface portions 17 permit foreign material such as dust, etc. attached to the electrodes 15 to be swept out to the external of the engagement recessed portions 14 by the group of terminals of the loading portion side.

At one corner portion of the front surface 11a side where terminal portion 12 is formed of the card body 11, there is provided, as shown in FIGS. 4 and 5, a chamfering portion 18 for permitting user to easily discriminate insertion direction into the host equipment or the adapter device 30. At the bottom surface 11b of the side where the chamfering portion 18 is formed of the card body 11, there is provided a hollow portion 19 which opens the side surface 11c side of the side where the front surface 11a and the chamfering portion 18 are provided and which is formed in a manner lower by one step with respect to the bottom surface 11b of the card body 11. At the hollow portion 19, there is provided a projected portion 20 which is continuous to the side surface 11c of the side where the chamfering portion 18 is provided and which has a summit portion of substantially the same height as the bottom surface 11b. As the result of the fact that the projected portion 20 is provided at the hollow portion 19, an erroneous insertion preventing recessed portion 21 with respect to the insertion/withdrawal portion 2 into or from the host equipment is constituted at the inside thereof. When the IC card 10 is inserted into the insertion/withdrawal opening 2 in a normal state, erroneous insertion preventing projection provided at the loading portion of the host equipment is engaged with the erroneous insertion preventing recessed portion 21 to permit loading of the IC card 10.

When the IC card 10 fails to be inserted into the host equipment from the insertion/withdrawal opening 2 in a normal state, as the result of the fact that the erroneous insertion preventing projection of the host equipment 1 comes into contact with the front surface 11a of the card body 11 in which the chamfering portion 18, the hollow portion 19 and/or the erroneous insertion preventing recessed portion 21 are provided, it is limited that the plural electrodes 15 and a group of terminals of the host equipment side are engaged with engagement recessed portions 14 partitioned by partition walls 13. Thus, the respective electrodes 15 are prevented from coming into contact with a group of terminals of the host equipment side to realize protection of these electrodes 15 and semiconductor integrated circuit elements included within the card body 11.

At the bottom surface 11b of the side where the chamfering portion 18 is formed of the card body 11, as shown in FIG. 5, there is provided, in the vicinity of hollow portion 19, a slip-off or falling-off preventing recessed portion 22 for preventing slip-off from the loading portion of the IC card 10 when the IC card 10 is loaded with respect to the loading portion of the host equipment. The slip-off preventing recessed portion 22 is provided in a manner to open one side surface 11c which is in parallel to insertion direction into the host equipment of the IC card 10 and the bottom surface 11b. The slip-off preventing piece of the loading portion side of the host equipment is engaged with the slip-off preventing recessed portion 22 only when the IC card 10 is inserted into the insertion/withdrawal portion 2 with respect to the host equipment in a normal state. It is to be noted that, as the result of the fact that the projection 20 constituting the above-described erroneous insertion preventing recessed portion 21 is provided in a manner continuous to one side surface 11c of the card body 11 and the front end portion of the front surface 11a side is formed so as to take substantially arc shape, when the IC card 10 is loaded with respect to the loading portion of the host equipment, the slip-off prevention piece comprised of the elastic piece, etc. which is caused to undergo elastic displacement in the short side direction of the IC card 10 to be inserted smoothly rides on the side surface 11c so that it is engaged with the slip-off preventing recessed portion 22.

At the bottom surface 11b of the side where the chamfering portion 18 is formed of the card body 11, there is provided, at the front surface 11a side of the card body 11, a recessed portion 23 for eject with which eject mechanism for ejecting IC card 10 provided at the loading portion side of the host equipment from the loading portion is engaged. The eject recessed portion 23 is provided in a manner to open the portion extending from the other side surface 11d in parallel to the insertion direction into the host equipment of the IC card 10 to the bottom surface 11b, and the eject mechanism of the loading portion side is engaged with the eject recess portion 23 only when the IC card 10 is inserted into the insertion/withdrawal opening 2 with respect to the host equipment in a normal state.

At the bottom surface 11b side of the card body 11, there is provided an erroneous recording prevention switch 24 positioned in the vicinity of the terminal portion 12 and serving to prevent that data is erroneously recorded into the semiconductor memory. The erroneous recording prevention switch 24 can be moved in the same direction as insertion/withdrawal direction with respect to the host equipment of the IC card 10, and is connected to operation element provided on the printed wiring board within the card body 11. The erroneous recording preventing switch 24 is adapted so that when it is sled in one direction, recording of data can be permitted, while when it is slid in the other direction, overwrite operation of new data is inhibited.

Further, the IC card 10 is provided, at the rear surface 11e of the card body 11, with a discrimination recessed portion 25 for discriminating between audio IC card having copyright management function with a view to preserving audio data and general purpose IC card with a view to preserving other data such as processing data processed at the computer, etc. The discrimination recessed portion 25 is provided only at the audio IC card, and is not provided at the general purpose IC card. Accordingly, the IC card 10 provided with the discrimination recessed portion 25 is used for the purpose of preservation of audio data.

In concrete terms, the discrimination recessed portion 25 is provided at the position shifted from the center of the width direction perpendicular to the insertion direction into the host equipment in which the IC card is loaded of the card body 11 toward one side surface 11c side where the chamfering portion 18 is provided of the card body 11. Other recessed portions, i.e., engagement recessed portion 14, hollow portion 19, erroneous insertion preventing recessed portion 21 slip-off prevention recessed portion 22 and eject recessed portion 23 are adapted so that the bottom surface 11b side of the card body 11 is opened and the top face 11f side of the card body 11 is closed, whereas the discrimination recessed portion 25 is continuous, i.e., is penetrated extending from the top face 11f of the card body 11 toward the bottom face 11b and its side surface is formed by curve so that smooth feel is provided.

Further, at the bottom surface 11b of the card body 11, there is provided a memorandum area 26. Within the memorandum area 26, indication indicating machine kind name of the IC card 10 and/or recording contents recorded with respect to the IC card 10, etc. are implemented by printing or marking, etc., and recording content is directly described as memorandum by using pen by user. It is a matter of course that the memorandum area 26 may be provided at the top face 11f side, and such memorandum areas may be provided on both the bottom face 11b and the top face 11f. Further, label may be stuck into the memorandum area 26.

The IC card 10 which has been small-sized while complying with the fundamental configuration of the standard IC card as described above cannot be loaded at host equipment 1 such as recording and/or reproducing apparatus for audio data, personal computer, digital still camera or digital video camera, etc. which can exclusively load only IC card having the standard dimensions. The adapter device 30 according to the present invention permits the small-sized IC card 10 to be loaded with respect to the host equipment 1 which can exclusively load only IC card having standard dimensions. Namely, the adapter device 30 serves to permit the small-sized IC card 10 to be loaded with respect to the host equipment 1 for IC card of the standard use while maintaining compatibility with the IC card of the standard specification. The adapter device 30 is formed so as to take substantially the same dimensions as those of the IC card constituted by the above-described standard specification, and permits the small-sized IC card 10 to be loaded with respect to the host equipment 1 having loading portion corresponding to the IC card of the standard specification.

As shown in FIGS. 2 and 3, the adapter device 30 includes a casing 31 constituting the device body. The IC card 10 is loaded within the casing 31.

The adapter device 30 which allows the small-sized IC card to be substantially equal to the IC card of the standard size in the outer appearance shape comprises, as shown in FIGS. 2 and 3, casing 31 having substantially the same size as the standard IC card as described above and formed so as to take substantially rectangular shape. The casing 31 includes a lower case 32 formed so as to take substantially the same size as that of the standard IC card, an upper case 33 attached to the lower case 32 and attached to the front surface 31a of the insertion side into the host equipment 1 or the adapter device 30 of the lower case 32, and a cover 34 attached to the lower case 32 together with the upper case 33 and serving to hold the IC card 10. The casing 31 constitutes, therewithin, a loading portion 35 in which the IC card 10 is loaded.

Figure 6:
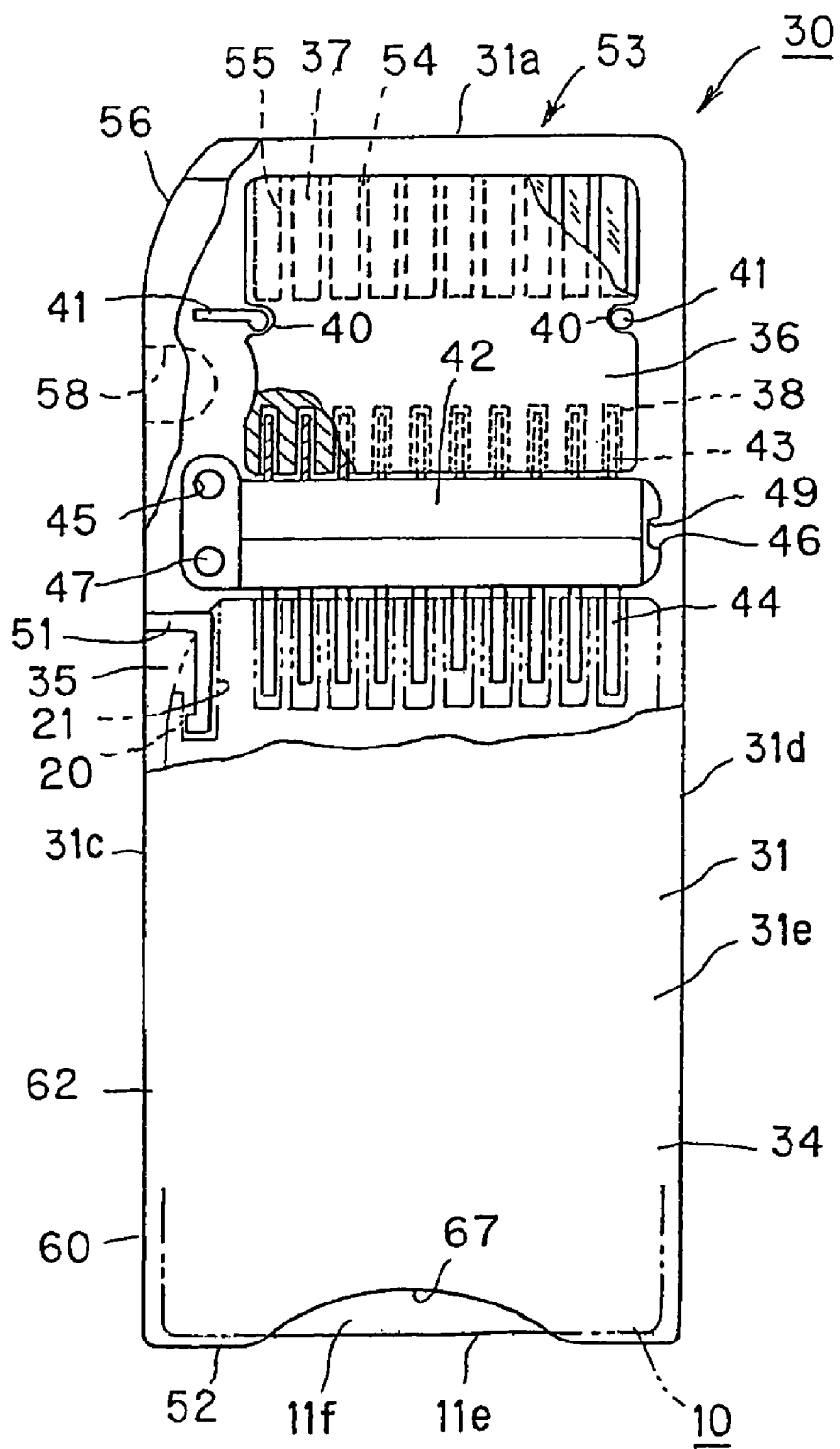
FIG. 6 is a perspective plan view for explaining the internal structure of the adapter device.

The lower case 32 is formed by injection-molding synthetic resin so as to have substantially the same size as that of the conventional IC card, and a relay board 36 comprised of printed wiring board having rigidity is disposed, as shown in FIG. 6, at the front surface 31a side of the casing 31. The relay board 36 is formed so as to take rectangular shape, wherein a plurality of first contacts 37 with which a group of terminals provided at the loading portion of the host equipment 1 are caused to be in contact are provided at one side of the long side, i.e., at the front surface 31a side of the casing 31 in correspondence with the number of electrodes 15 of the IC card 10, in concrete terms, ten first terminals 37 are provided in line. Moreover, at the other portion of the long side of the relay board 36, plural second contacts 38 to which a terminal plate 42 for realizing electrical connection to the electrodes 15 of the IC card 10 is electrically connected by soldering, etc. are provided in correspondence with the number of the first contacts 37. At such relay board 36, recessed portions 40, 40 for positioning are provided at respective short sides opposite to each other. As the result of the fact that these positioning recessed portions 40, 40 are engaged with positioning projections 41, 41 provided at the lower case 32, the relay board 36 is attached in a manner extending in the short side direction of the lower case 32 in the case where it has been caused to undergo positioning at the lower case 32.

At the lower case 32, there is attached a terminal plate 42 for electrically connecting the terminal portion 12 of the IC card 10 loaded at the loading portion 35 and the relay board 36 in a manner adjacent to the relay board 36. The terminal plate 42 is constituted by fixing conductive plural terminal members by insulating resin member, and the entirety thereof is formed so as to take substantially rectangular shape. Plural terminal members fixed in the state electrically insulated by resin member exist by the number of first and second contacts 37, 38, wherein one end portion serves as a terminal 43 connected to the second contact 38 of the relay base 36 and the other end portion serves as a connection terminal 44 which is caused to be in pressure contact with the electrodes 15 constituting the terminal portion 12 of the IC card 10. In concrete terms, the terminal 43 is positioned at the relay board 36 side, and is electrically connected to the second contact 38 of the relay board 36 by soldering, etc. Moreover, the connection terminal 44 of the loading portion 35 side is constituted by elastic piece bent so as to take substantially L-shape. The connection terminal 44 is extended toward the loading portion 35 side, whereby it comes into pressure contact with the electrode 15 of the IC card 10 when the IC card 10 is loaded at the loading portion 35. As a result, the connection terminal 44 is electrically connected to the electrode 15 of the IC card 10, and serves to hold the IC card 10 at the loading portion 35.

In such terminal plate 42, positioning holes 45, 45 are provided at one short side, and a positioning recessed portion 46 is formed at the other short side. At the relay board 36, as shown in FIG. 6, positioning projections 47, 47 provided at the lower case 32 are inserted into positioning holes 45, 45, and a positioning projection 49 provided at the lower case 32 is engaged with the positioning recessed portion 46. Further, by implementing ultrasonic soldering, etc. to positioning projections 47, 47 and/or the positioning projection 49, the relay board 36 is attached in a manner extending in the short side direction of the lower case 32 in the state where it has been caused to undergo positioning at the lower case 32.

Moreover, at the lower case 32, there is provided a loading portion 35 in which the IC card 10 is loaded in a manner adjacent to the terminal plate 42. At the loading portion 35, there is provided an erroneous insertion preventing projection 51 for preventing erroneous insertion of the IC card 10. The erroneous insertion preventing projection 51 is formed so as to take substantially L-shape, wherein the long side is extended in the insertion direction of the IC card 10. When the IC card 10 is inserted in a normal state, the erroneous insertion preventing projection 51 is engaged with the erroneous insertion preventing recessed portion 21 provided at the front surface 11a of the IC card 10. Moreover, when the IC card 10 is inserted in the abnormal state, e.g., in the back state, the erroneous insertion preventing projection 51 collides against the front surface 11a of the IC card 10 so that it is not engaged with the erroneous insertion preventing recessed portion 21. Thus, the erroneous insertion preventing projection 51 serves to prevent the IC card 10 from being loaded with respect to the loading portion 35.

The relay board 36 and the terminal plate 42 which have been described above are attached to predetermined positions of the front portion of the lower case 32 as described above. Thereafter, the upper case 33 is attached to the front portion of the lower case 32 by ultrasonic welding, etc. Namely, when the upper case 33 is attached to the lower surface 32, it constitutes a parts accommodating portion which accommodates the relay board 36 and/or the terminal plate 42. The cover 34 is attached to the lower case 32 in such a manner continuous to the upper case 33. When the cover 34 is attached to the lower case 32, it constitutes, along with the lower case 32, loading portion 35 in which the IC card 10 is loaded. As the result of the fact that the cover 34 is attached to the lower case 32, an insertion/withdrawal opening 52 for inserting the IC card 10 into the loading portion 35 is constituted at the rear surface side opposite to the front surface 31a of the casing 31.

At the front surface 31a side of the casing 31 constituted as the result of the fact that the upper case 33 and the cover 34 are attached to the lower case 32, as shown in FIGS. 2 and 3, there is provided a terminal portion 53 required for allowing the adapter device 30 to perform transmission/reception of data to and from the host equipment 1. The terminal portion 53 includes plural partition walls 54 which partition the first contacts 37 provided on the above-described relay board 36, and these partition walls 54 constitute plural engagement recessed portions 55 with which a group of terminals provided at the loading portion side of the host equipment 1 are engaged. At these engagement recessed portions 55, the front surface 31a side and the bottom face 31b side of the casing 31 are opened so that a group of terminals provided at the loading portion side of the host equipment 1 can be engaged with these engagement recessed portions 55. The first contacts 37 are provided at the bottom surfaces of respective engagement recessed portions 55, and are separated by the partition walls 54. As the result of the fact that the first contact 37 is provided at the bottom surface of the engagement recessed portion 55, it is prevented by the engagement recessed portion 55 that finger, etc. directly comes into contact with the first contact 37. Thus, the first contacts 37 are protected.

In this example, respective first contacts 37 constituting the terminal portion 53 are connected in series with respective connection terminals 44 through the relay board 36 and the terminal plate 42 without providing intermediate circuits such as data converting circuit and/or amplifier circuit, etc. in the state where the electric circuit configuration has been simplified. It is a matter of course that intermediate circuits such as data converting circuit and/or amplifier circuit, etc. may be provided between the first contacts 37 and the connection terminal 44.

Moreover, at the front surface 31a of the casing 31 and the opening end of the partition walls 54, as shown in FIG. 3, there are provided inclination surface portions 61 in a manner extending from the middle portion of the thickness direction of the front surface 31a of the casing 31 toward the bottom surface 31b. The inclination surface portion 61 functions as an insertion guide portion in inserting the adapter device 30 into the insertion/withdrawal opening 2 of the host equipment 1. Further, at the casing 31, there are provided inclination surface portions 62 in a manner extending from the bottom surfaces of respective engagement recessed portions 55 toward the bottom surface 31b of the casing 31. When the adapter device 30 is loaded with respect to the loading portion of the host equipment 1, the inclination surface portions 62 are adapted to have ability to sweep out foreign material such as dust, etc. attached to the first contact 37 toward the external portion of the engagement recessed portion 55 by a group of terminals of the loading portion side of the host equipment 1.

Further, at one corner portion of the front surface 31a side where terminal portions 53 are formed of the casing 31, there is provided a chamfering portion 56 in order that user can easily discriminate insertion direction of the host equipment 1 of the adapter device 30. At bottom surface 31b of the side where the chamfering portion 56 is formed of the casing 31, there is provided a hollow portion 57 which opens the side surface 31c side of the side where the front surface 31a and the chamfering portion 56 are provided, and which is lower by one step with respect to the bottom surface 31b of the casing 31. The hollow portion 57 functions as an erroneous insertion preventing groove with respect to the host equipment 1 of the adapter device 30. Only when the adapter device 30 is inserted into the loading portion of the host equipment 1 in a normal state, an erroneous insertion preventing projection provided at the loading portion of the host equipment 1 side is engaged with the hollow portion 57. Namely, when the adapter device 30 is inserted into the loading portion of the host equipment 1 in the abnormal state, e.g., in back side state, the erroneous insertion preventing groove constituted by the hollow portion 57 collides against the front surface 31a of the casing 31 so that the adapter device 30 is not loaded into the loading portion of the host equipment 1. Thus, a group of terminals provided at the loading portions of the host equipment 1 are prevented from being engaged with the engagement recessed portion 55 so that the first contact 37 is not damaged.

Further, at the bottom surface 31b of the side where the chamfering portion 56 is formed of the casing 31, there is provided, in the vicinity of the hollow portion 57, a slip-off preventing recessed portion 58 for preventing the IC card 10 from being slipped off when the IC card 10 is loaded at the loading portion of the host equipment 1. The slip-off preventing recessed portion 58 is provided in a manner to open one side surface 31c in parallel to insertion direction into the host equipment of the IC card 10 and the bottom surface 31b so that the slip-off prevention piece of the loading portion side of the host equipment 1 can be engaged with the slip-off preventing recessed portion 58 only when the IC card 10 is inserted into the insertion opening of the host equipment in a normal state.

Further, at the bottom surface 31b of the side surface 31d side of the side opposite to the side surface 31c of the casing 31, there is provided, at the middle portion thereof, a recessed portion 59 for eject with which an eject mechanism for ejecting, from the loading portion, the IC card 10 provided at the loading portion side of the host equipment is engaged. The eject recessed portion 59 is provided in such a manner that the other side surface 31d in parallel to insertion direction into the host equipment of the IC card 10 and the bottom surface 31b are opened. Only when the IC card 10 is inserted into the insertion opening of the host equipment 1 in a normal state, the eject mechanism of the loading portion side of the host equipment 1 can be engaged with the eject recessed portion 59.

Further, as shown in FIG. 2, at the top face 31e of the casing 31, a first insertion direction indication portion 63 indicating insertion direction into the host equipment 1 of the adapter device 30 is provided by sign such as triangle, etc. The first insertion direction indication portion 63 is formed by printing or marking, etc. in the vicinity of the chamfering portion 56 of the upper case 33. The top face 3e of the casing 31 is the area noticed for user to the greatest degree. In this example, at the adapter device 30, the configuration functionally required which is provided on the top face 31e of the casing 31 is caused to be only first insertion direction indication portion 63, thereby making it possible to freely implement design onto the top face 31e of the casing 31. In addition, at the adapter device 30, the configurations functionally required are provided to more degree at the bottom surface 31b in dependency upon the degree that these configurations are not provided on the top face 31e of the casing 31.

At the bottom surface 31b of the casing 31, as shown in FIG. 3, there are provided a second insertion direction indication portion 64 indicating insertion direction into the host equipment 1 of the adapter device 30 and insertion direction into the adapter device 30 of the IC card 10, and an insertion attitude indication portion 65 indicating insertion attitude into the adapter device 30 of the IC card 10. The second insertion direction indication portion 64 and the insertion attitude indication portion 65 are formed by printing or marking, etc. At the second insertion direction indication portion 64, e.g., arrow indicating insertion direction into the host equipment 1 is illustrated. At the insertion attitude indication portion 65, model view of the IC card 10 is illustrated. The IC card 10 is inserted into the adapter device 30 with the front surface 11a being as insertion end in such a manner that the bottom surface 31b of the casing 31 and the bottom surface 11b of the IC card 10 are opposed to each other. In view of the above, the insertion attitude indication portion 65 is caused to be of the configuration so that face and back and the insertion end when the IC card 10 is inserted into the adapter device 30 can be visually confirmed by user. Namely, when user looks at the bottom surface 31b with the bottom surface 31b of the casing 31 being positioned at this side, user is required to insert the IC card 10 into the insertion/withdrawal opening 52 of the adapter device 30 in the state where the bottom surface 11b of the IC card 10 is positioned at this side and the front surface 11a is caused to be insertion end. In view of the above, at the insertion attitude indication portion 65, model view of the bottom surface 11b in which the front surface 11a of the IC card 10 is caused to be the front surface 31a side of the casing 31 is illustrated.

The cover 34 which constitutes the top face 31e of the casing 31 along with the upper case 33 is formed by material different from that of the lower case 32 or the upper case 33, and is formed by bending steel metal having mechanical strength higher than that of the lower case 32 or the upper case 33 which is molded by, e.g., resin. The cover 34 is adapted so that both side edges in length direction are formed to be substantially channel-shaped in cross section, and constitutes the top face 31e of the casing 31 and is formed in such a manner to cover side walls formed in rising manner at both side edge portions in length direction of the lower case and both side edge portions in length direction of the bottom surface 31b. The cover 34 is fixed on the lower case 32 as the result of the fact that holding projections 34a formed at the side walls of the lower case 32 are held at holding holes 34b provided in correspondence with holding projections 34a. Because steel metal having high mechanical strength is used, the cover 34 serves to enhance holding force of the IC card 10 loaded at the loading portion 35 while realizing thin structure of the top face 31e of the casing 31, and can sufficiently protect the loaded IC card 10 from external pressure such as impact, etc.

Figure 7:
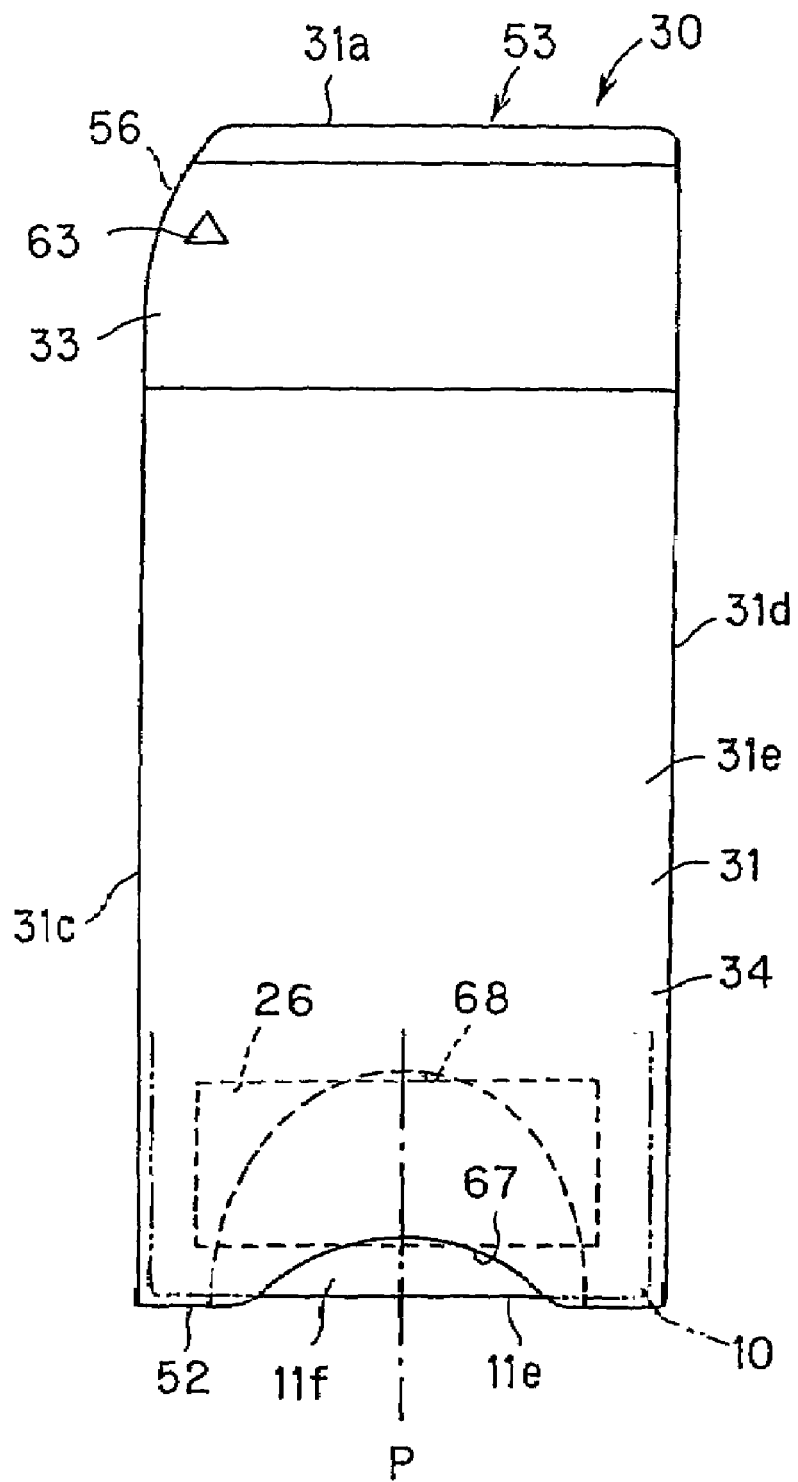
FIG. 7 is a plan view for explaining cut portions provided in a manner opposite to each other at the casing rear surface side of the adapter device.

As shown in FIG. 7, an insertion/withdrawal opening 52 of the IC card 10 is formed by the rear surface side of the lower case 32 which constitutes the bottom surface 31b of the casing 31 and the rear surface side of the cover 34 which constitutes the top face 31e of the casing 31. At the rear surface sides of the top face 31e and the bottom surface 31b of the casing 31, there are formed, in a manner continuous to the insertion/withdrawal opening 52, cut portions 67, 68 for allowing the top face 11f and the bottom face 11b of the IC card 10 loaded at the loading portion 35 to be exposed.

The cut portion 67 formed at the top face 31e of the casing 31 is formed at the end portion of the rear surface side of the cover 34, and the cut portion 68 formed at the bottom surface 31b of the casing 31 is formed at the end portion of the rear surface side of the lower case 32. These cut portions 67, 68 are formed in a manner opposite to each other so as to have ability to face the top face 11f and the bottom face 11b of the rear surface side of the IC card 10 toward the external. When the IC card 10 is loaded at the loading portion 35, the cut portions 67, 68 serve to face the top face 11f and the bottom face 11b of the rear surface side of the IC card 10 toward the external so that user grasps the top face 11f and the bottom face 11b to have ability to easily draw out the IC card 10 from the loading portion 35.

The cut portion 68 of the bottom surface 31b side of the casing 31 is formed so that it is greater than the cut portion 67 of the top surface 31e side. At the bottom surface 31b side of the casing 31, there is provided memorandum area 26 of the IC card 10. When the IC card 10 is loaded at the loading portion 35, the cut portion 68 serves to face the memorandum area 26 toward the external so that the memorandum area 26 can be visually recognized in the state where the IC card 10 is loaded at the adapter device 30. Moreover, the cut portion 67 of the top face 31e side of the casing 31 and the cut portion 68 of the bottom face 31b side thereof are caused to have shapes different from each other, whereby, at the time of loading of the IC card 10 or at the time of insertion into the host equipment 1 of the adapter device 30, user can confirm face side and back side of the adapter device 30 by feeling.

The cut portions 67, 68 are formed so that they are linearly symmetrical with center line P of width direction perpendicular to insertion direction into the host equipment of the casing 31 being as reference. Thus, user is permitted to facilitate user to grasp the upper face 11f and the bottom face 11b of the rear surface side of the IC card 10 which have been faced from the cut portions 67, 68 toward the external. In addition, the central area of the memorandum area 26 of the IC card 10 can be faced from cut portion 68 of the bottom face 31b side of the casing 31 toward the external.

In concrete terms, cut portion 67 formed at the upper face 31e of the casing 31 and cut portion 68 formed at the bottom face 31b thereof are formed so that the end surfaces take substantially circular arc and cut quantity on the center line P in width direction of the casing 31 is maximum. It is to be noted that shapes of cut portions 67, 68 are not limited to substantially circular arc shape, and are not limited particularly to rectangular shape, etc.

In this example, the cover 34 constituting the loading portion 35 is formed by sheet metal. Accordingly, when insertion/withdrawal of the IC card is performed, IC card 10 formed by synthetic resin and cover 34 formed by sheet metal come into contact with each other so that any defect would take place at the surface of the IC card 10. In view of the above, fluorine coating may be implemented, as protective coating, to the insertion/withdrawal opening 52 side of the back side of at least loading portion 35 side of the cover 34. Moreover, fluorine coating may be implemented also to the surface side constituting the armor of the cover 34 in order to constitute a portion of armor. Further, fluorine coating may be implemented also to the peripheral portion of the insertion/withdrawal opening 52 to have ability to prevent finger, etc. of user from being damaged by burr formed at the end portion of the cover 34, etc. The area where fluorine coating is implemented to the surface of the cover 34 may be provided at least at the rear surface side of the cover 34, i.e., at the peripheral portion of the insertion/withdrawal opening 52, and other areas may be changed as occasion demands in dependency upon the armor.

Then, a method of inserting the IC card 10 into the adapter device 30 will be explained. As shown in FIGS. 2 and 6, the IC card 10 is inserted into the insertion/withdrawal opening 52 of the adapter device 30 in the state where the top face 11f is caused to be top face 31e side of the casing 31 with the front surface 11a where terminal portions 12 are provided of the card body 11 being as insertion end. Further, when the IC card 10 is inserted from the insertion/withdrawal opening 52 of the adapter device 30 in a normal state, erroneous insertion preventing projection 51 is engaged with erroneous insertion preventing recessed portion 21 at the IC card 10. The connection terminal 44 faced to the loading portion 35 admits into engagement recessed portion 14 which constitutes the terminal portion 12 of the IC card 10 so that it comes into pressure contact with the first contact 37. Thus, there results the state where the adapter device 30 and the IC card 10 are electrically connected. Namely, the electrode 15 of the IC card 10 and the first contact 37 of the adapter device 30 are electrically connected through the relay board 36 and the terminal plate 42. In the state where the IC card 10 is normally inserted into the adapter device 30, the adapter device 30 is placed in the state where the entirety of the IC card 10 is accommodated at the loading portion 35. The IC card 10 has the same dimensions as those of existing IC cards, resulting in the state where loading into the loading portion of the host equipment 1 can be made.

When the IC card 10 is inserted into the adapter device 30, user visually recognizes the second insertion indication portion 64 and the insertion attitude indication portion 65 which are provided at the bottom surface 31b of the casing 31 to thereby to confirm the insertion direction or the insertion attitude of the IC card 10 thereafter to have ability to perform insertion operation into the adapter device 30 of the IC card 10. Accordingly, it is prevented that the connection terminal 44 provided at the loading portion 35 is stained by erroneous insertion of the IC card 10. Moreover, the face side and the back side of the adapter device 30 can be confirmed by visually recognizing or feeling shapes of cut portion 67, 68 provided at the rear surface side of the casing 31. Thus, user confirms the face side and the back side of the adapter device 30 thereafter to perform insertion operation of the IC card 10, thereby making it possible to prevent erroneous insertion of the IC card 10.

The memorandum area 26 provided at the rear surface side of the bottom surface 11b of the IC card 10 is faced to the outside from the cut portion 68 in the state where the IC card 10 is loaded into the adapter device 30. Thus, user can confirm the content described in the memorandum area 26 by visual recognition.

It is to be noted that when the IC card 10 is inserted into the adapter device 30 in the back state where the bottom face 11b is upwardly positioned or in the state in opposite direction in which the rear surface 11e is caused to be the insertion side, the erroneous insertion preventing projection 51 provided at the loading portion 35 collides with the front surface 11a or the rear surface 11e so that the IC card 10 is not loaded into the loading portion 35. Thus, the IC card 10 is placed in the state where the rear surface 11e side is projected from the insertion/withdrawal opening 52. As a result, user can immediately recognize that insertion direction of the IC card is erroneous.

The IC card 10 loaded at the loading portion 35 of the adapter device 30 can be easily drawn out from the loading portion 35 of the adapter device 30 in the state where the top face 11f and the bottom face 11b of the rear surface side of the IC card 10 exposed to the external from cut portions 67, 68 formed in a manner continuous to the insertion/withdrawal opening 52 are grasped.

Then, explanation will be given with reference to FIG. 1 in connection with a method of inserting the IC card into the host equipment 1 of the adapter device 30 in which the IC card 10 is loaded at the loading portion 35. The adapter device 30 is inserted into the insertion/withdrawal opening 2 of the host equipment 1 in the state where the top face 31e is positioned at the upper side with the front surface 31a where the terminal portion 53 is provided of the casing 31 being as insertion end. When the adapter device 30 is inserted in a normal state from the insertion/withdrawal opening 52, erroneous insertion preventing projection provided at the loading portion of the of the host equipment 1 is engaged with the erroneous insertion preventing groove constituted by the hollow portion 57 at the adapter device 30. Moreover, slip-off prevention piece comprised of elastic piece provided at the loading portion of the host equipment 1 is engaged with slip-off prevention recessed portion 58. Further, as the result of the fact that a group of terminals of the loading portion of the host equipment 1 admits from engagement recessed portion 55 to the first contact 37 which constitutes the terminal portion 53, the group of terminals is placed in pressure contact state. Thus, there results the state where transmission/reception of data to and from the IC card 10 electrically connected to the adapter device 30 can be made.

As stated above, since the chamfering portion 56 is provided at the front surface 31a side of the casing 31 serving as insertion end into the host equipment 1 when user inserts the host equipment 1 into the adapter device 30, it is possible to easily discriminate insertion direction. Moreover, at the adapter device 30, since any recessed portion is not provided at the upper surface 31e, and engagement recessed portion 55, hollow portion 57, slip-off prevention recessed portion 58 and eject recessed portion 59 are provided at the bottom surface 31b side, difference between shape of the top face 31e and that of the bottom surface 31b is confirmed. In addition, difference between shape of cut portion 67 and that of cut portion 68 which are provided at the rear surface portion of the casing 31, thereby making it possible to confirm face side and back side at the time of insertion into the host equipment 1. Further, user visually recognizes first insertion direction indication portion 63 provided on the upper surface 31e of the casing 31, thereby making it possible to confirm insertion direction into the insertion opening 2 of the host equipment 1 of the adapter device 30.

In this example, when the adapter device 30 is inserted into the host equipment 1 in the back state where the bottom surface 31b is positioned in upper direction, or in the reverse state where the rear surface is caused to be the insertion side, the erroneous insertion preventing projection provided at the loading portion of the host equipment 1 collides against the front surface 31a or the rear surface so that the adapter device 30 is not loaded at the loading portion. Thus, user can immediately recognize that insertion direction of the IC card 10 is erroneous.

In this case, the adapter device 30 loaded at the host equipment 1 is ejected from the insertion/withdrawal opening 2 toward the external by eject mechanism engaged with the eject recessed portion 59 provided at the casing 31.

In the adapter device 30 as described above, the insertion direction of the IC card 10 is the same as the insertion direction into the host equipment 1 of the IC card 10, the insertion direction into the host equipment 1 of the existing IC card, and the insertion direction into the host equipment 1 of the adapter device 30. Thus, user can easily recognize insertion direction into the adapter device 30 of the IC card 10.

Moreover, at the adapter device 30, since erroneous insertion preventing projection 51 to be engaged with the erroneous insertion preventing recessed portion 21 of the IC card 10 is provided at the loading portion 35, it is possible to prevent erroneous insertion into the adapter device 30 of the IC card 10. Namely, when the IC card 10 is erroneously inserted into the adapter device 30, the outer surface side of the IC card 10 is projected from the insertion/withdrawal opening 52. From this fact, user can easily recognize that insertion of the IC card 10 is erroneous insertion.

At the adapter device 30, since the cut portions 67, 68 provided at the rear surface side of the casing 31 are formed in the state where their shapes are different from each other, it is possible to confirm face side and back side. After confirmation of the face side and the back side, insertion direction and/or insertion attitude of the IC card 10 can be further confirmed by the second insertion direction indication portion 64 or the insertion attitude indication portion 65 provided at the bottom surface 31b of the casing 31. As described above, at the adapter device 30, since user can perform operation confirmation of the IC card 10 by various means before insertion operation of the IC card 10, it is possible to prevent, in advance, erroneous insertion of the IC card 10.

Moreover, when the IC card 10 is loaded into the adapter device 30, the memorandum area 26 provided at the bottom surface 11b of the IC card 10 is faced toward the external from cut portion 68 provided at the bottom surface 31b side of the casing 31. Thus, user can confirm description content of the memorandum area 26 even in the state where the IC card 10 is loaded at the adapter device 30.

At the time of loading of the IC card 10, at the adapter device 30, the rear surface side of the IC card 10 is faced toward the external. Thus, user easily grasps, such as picks up by finger, etc. the top face 31e and the bottom face 31b of the IC card 10 faced toward the external from the cut portions 67, 68 to have ability to take out the IC card 10 attached to the adapter device 30.

Further, at the adapter device 30, with respect to the display portions functionally required, the first insertion direction indicating portion 53 is only provided at the top face 31e of the casing 31, and the remaining portions are provided at the bottom surface 31b side. Accordingly, it is possible to freely perform design of the top face 31e which is the plane surface noticed for user to the greatest degree.

The IC card 1 loaded to the previously explained adapter device 30 may be IC card with image pick-up device such as CCD (Charge-Coupled Devices), etc., IC card with GPS (Global Positioning System), and/or IC card for wireless communication interface such as Bluetooth, etc. in addition to the IC card for memory, and its function is not particularly limited.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

As described above, in accordance with the adapter device for electronic equipment (e.g., IC card) according to the present invention, cut portions are provided at surfaces opposite to each other of the device body in a manner opposite to each other. Accordingly, user can take out electronic equipment loaded at the loading portion, e.g., in a manner to pick up upper and lower surfaces of the rear surface side of the electronic equipment exposed from, e.g., cut portions, thus making it possible to realize improvement in operability.

The invention claimed is:

1. An IC card adapter device for host electronic equipment comprising:
   a device case connected with the host electronic equipment;
   a loading portion provided at one side surface of the device case adapted to connect the host electronic equipment, the host electronic equipment including at least one semiconductor integrated circuit element, and said host electronic equipment including a first terminal;
   a second terminal provided at the loading portion of the device case, adapted for performing transmission/reception of data to the first terminal;
   an insertion/withdrawal opening provided at the other side surface opposite to the one side surface of the device case;
   cut portions respectively provided at the other side surface of the device case, and serving to face toward the external surface, wherein one of the cut portions is greater than the other serving to face a memorandum area of an IC card toward the external surface so that the memorandum area can be visually recognized in the state where the IC card is connected to the IC card adapter device;
   a first insertion direction indication portion provided on the upper surface of the casing of the IC card adapter device to conform insertion direction into the insertion portion of the host equipment; and
   a second insertion direction indication portion and an insertion attitude indication portion provided at the bottom surface of the casing of the IC card adapter device, said insertion attitude indication portion consisting of a model view of the IC card to prevent erroneous insertion of the IC card.

2. The IC card adapter device for said host electronic equipment as set forth in claim 1,
   wherein the cut portions are substantially symmetrical with a line in width direction perpendicular to insertion direction of the IC card.

3. The IC card adapter device for said host electronic equipment as set forth in claim 1,
   wherein the cutting portion is formed so that the bottom face side of the device case is greater than the top face side thereof.

4. The IC card adapter device for said host electronic equipment as set forth in claim 1, wherein the second terminal and the connecting portion of the IC card are electrically connected through a relay board disposed on the device case.

5. The IC card adapter device for said host electronic equipment as set forth in claim 1,
wherein the loading portion is provided wit an erroneous insertion preventing recessed portion provided at one end side of the host electronic equipment when the host electronic equipment is connected in a normal state.

6. The IC card adapter device for said host electronic equipment as set forth in claim 1,
wherein the IC card adapter device dimensions are substantially the same as the standard dimensions for said host electronic equipment.

* * * * *